US012570146B2

(12) United States Patent
Takei et al.

(10) Patent No.: US 12,570,146 B2
(45) Date of Patent: Mar. 10, 2026

(54) INFORMATION APPARATUS AND MENU DISPLAY METHOD

(71) Applicant: Faurecia Clarion Electronics Co., Ltd., Saitama (JP)

(72) Inventors: Shingo Takei, Saitama (JP); Taishin Konishi, Saitama (JP); Haruki Ono, Saitama (JP); Kazuya Ninomiya, Saitama (JP); Kazunori Sato, Saitama (JP); Toshiyuki Takatani, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 109 days.

(21) Appl. No.: 18/243,351

(22) Filed: Sep. 7, 2023

(65) Prior Publication Data

US 2024/0111393 A1     Apr. 4, 2024

(30) Foreign Application Priority Data

Sep. 29, 2022     (JP) ................................. 2022-156109

(51) Int. Cl.
*B60K 35/10*          (2024.01)
*B60K 35/22*          (2024.01)
(Continued)

(52) U.S. Cl.
CPC .............. *B60K 35/10* (2024.01); *B60K 35/22* (2024.01); *B60K 35/29* (2024.01); *B60K 35/81* (2024.01);
(Continued)

(58) Field of Classification Search
None
See application file for complete search history.

(56) References Cited

U.S. PATENT DOCUMENTS

| 7,543,244 | B2 * | 6/2009 | Matthews | ............. G06F 16/313 |
| | | | | 715/825 |
| 10,254,948 | B2 * | 4/2019 | Wan | .................... G06F 3/04817 |

(Continued)

FOREIGN PATENT DOCUMENTS

| JP | 2006-244155 A | 9/2006 |
| JP | 2006-309429 A | 11/2006 |

(Continued)

*Primary Examiner* — William L Bashore
*Assistant Examiner* — Koorosh Nehchiri
(74) *Attorney, Agent, or Firm* — Volpe Koenig

(57) ABSTRACT

A vehicle state detection unit detects whether a vehicle including an information apparatus is in motion or stopped. A display control unit displays operation items related to various functions provided by the information apparatus on a display. A function execution unit executes a function corresponding to a selected operation item. An identification unit identifies the frequency of use of each operation item by classifying the items according to whether the vehicle is in motion or stopped. The display control unit further displays on a prescribed menu screen in which some of the operation items are aggregated. On the prescribed menu screen, when the vehicle is in motion, the operation item identified as having a high frequency of use when the vehicle is in motion is displayed, and when the vehicle is stopped, the operation item identified as having a high frequency of use when the vehicle is stopped is displayed.

7 Claims, 10 Drawing Sheets

(51) Int. Cl.
  _B60K 35/29_        (2024.01)
  _B60K 35/81_        (2024.01)
  _G06F 3/0482_       (2013.01)

(52) U.S. Cl.
  CPC .... _G06F 3/0482_ (2013.01); _B60K 2360/1434_
      (2024.01); _B60K 2360/148_ (2024.01); _B60K_
                  _2360/186_ (2024.01)

(56)           References Cited

U.S. PATENT DOCUMENTS

| | | | | |
|---|---|---|---|---|
| 11,054,988 | B2 * | 7/2021 | Wang | G06F 3/04883 |
| 11,223,737 | B2 * | 1/2022 | Lim | H04N 1/00832 |
| 2004/0150674 | A1 * | 8/2004 | Takahashi | B60K 35/29 |
| | | | | 715/810 |
| 2006/0248474 | A1 | 11/2006 | Kimotsuki | |
| 2008/0155428 | A1 * | 6/2008 | Lee | G06F 3/0482 |
| | | | | 715/745 |
| 2009/0171529 | A1 * | 7/2009 | Hayatoma | B60K 35/22 |
| | | | | 701/36 |
| 2013/0132896 | A1 * | 5/2013 | Lee | G06F 16/907 |
| | | | | 715/846 |
| 2013/0190978 | A1 * | 7/2013 | Kato | H04M 1/72463 |
| | | | | 455/418 |
| 2015/0298548 | A1 * | 10/2015 | Maru | B60K 35/00 |
| | | | | 715/234 |
| 2016/0358311 | A1 * | 12/2016 | Chen | G06F 40/151 |
| 2020/0183558 | A1 * | 6/2020 | Chen | H04L 67/535 |
| 2021/0073008 | A1 * | 3/2021 | Park | H04M 1/72451 |

FOREIGN PATENT DOCUMENTS

| | | |
|---|---|---|
| JP | 2007-214690 A | 8/2007 |
| JP | 2020-201274 A | 12/2020 |

* cited by examiner

Operation count information 122

122 - 1

Week 38, 2022

| Operation items corresponding to detailed functions | Screen mode | | | | | | | | | Total count | Total when vehicle in motion | Total when vehicle stopped |
| | Radio | | Navi | | USB Audio | | ... | | | | | |
| | Vehicle in motion | Vehicle stopped | Vehicle in motion | Vehicle stopped | Vehicle in motion | Vehicle stopped | Vehicle in motion | Vehicle stopped | | | | |
| Return Home | 10 | 5 | 5 | 3 | 8 | 10 | 6 | 2 | ... | 49 | 29 | 20 |
| Re-search without expressway | 3 | 2 | 40 | 10 | 4 | 1 | 5 | 2 | ... | 67 | 43 | 15 |
| Search gas stations | 1 | 2 | 15 | 8 | 3 | 1 | 4 | 4 | ... | 38 | 23 | 15 |
| Vehicle speed-linked VOL setting | 10 | 3 | 16 | 5 | 3 | 3 | 1 | 5 | ... | 36 | 20 | 16 |

...

Week 37, 2022    122 - 2

Week 36, 2022    122 - 3

Week 35, 2022    122 - 4

FIG. 3

INFORMATION APPARATUS AND MENU DISPLAY METHOD

FIELD OF INVENTION

The present invention relates to an information apparatus and a menu display method.

BACKGROUND

In recent years, information apparatuses such as navigation devices, infotainment devices, and the like have become increasingly multifunctional, increasing the variety of available functions and audio and video sources. On the other hand, as information apparatuses becomes more multifunctional, user operations to use various functions are becoming more complicated.

In consideration of such user operability, some information apparatuses are equipped with a function for calling up a function registered by the user with a simple operation. Such call functions are called quick menus or shortcut keys. The quick menu is a menu that displays an aggregation of functions registered by the user. The user can easily call up and use the registered desired functions by using the quick menu.

However, in many cases, functions that can be registered in the quick menu are limited to those specified by the manufacturer of the information apparatus and the like. Therefore, the user may not be able to register a function in the quick menu even if frequently used.

Furthermore, Patent Document 1 proposes a technology that automatically detects and presents to the user applications that are habitually and repeatedly used by analyzing the driving history. Specifically, the technology in Patent Document 1 analyzes historical information of driving uses and non-driving uses, detects habitual uses, and presents the detected habitual uses to a user.

PRIOR ART DOCUMENTS

Patent Documents

[Patent Document 1] JP 2020-201274 A

SUMMARY

However, the technology in Patent Document 1 presents habitual uses automatically detected based on historical information such as driving applications and the like, and does not necessarily propose functions with a high frequency of use The frequency of use of various functions may vary depending on whether the vehicle is in motion or stopped. Therefore, the proposed function preferably takes into account such vehicle state (driving state) and the like. However, the technology in Patent Document 1 does not take into account the vehicle state or the like in this proposal.

Therefore, an object of the present invention is to propose a function with a high frequency of use to a user according to the situation and improve the operability and convenience of various functions.

Means for Solving the Problem

The present application includes means for solving at least a part of the problems described above, and examples thereof are as follows. An information apparatus in a vehicle according to an aspect of the present invention that solves the aforementioned problem includes: a vehicle state detection unit that detects whether the vehicle is in motion or stopped; a display control unit that controls a signal output to a display such that information containing operation items related to various functions provided by the information apparatus is displayed on the display; an input reception unit that receives an operation with respect to the operation items displayed on the display by a user; an execution unit that executes a command with respect to the operated operation item when the input reception unit receives an operation with respect to the operation item; and an identification unit that identifies the frequency of use of each of the operation items by classifying the items according to whether the vehicle is in motion or stopped. The display control unit controls to display a prescribed menu screen including selected items from the operation items on the display. When the vehicle is in motion, the prescribed menu contains one or more operation items which is identified by the identification unit that their frequency of use during the vehicle is in motion is high. On the other hand, when the vehicle is stopped, the prescribed menu contains one or more operation items which is identified by the identification unit that their frequency of use during the vehicle is stopped is high.

Effect of the Invention

The present invention can propose a function with a high frequency of use to a user according to the situation and improve the operability and convenience of various functions.

Note that problems, configurations, effects and the like other than those described above will become apparent from the following description of an embodiment.

BRIEF DESCRIPTION OF THE DRAWINGS

FIG. 3 is a diagram depicting an example of operation count information.

EMBODIMENTS OF THE INVENTION

The following description relates to an information apparatus according to an embodiment of the present invention.

Figure 1:
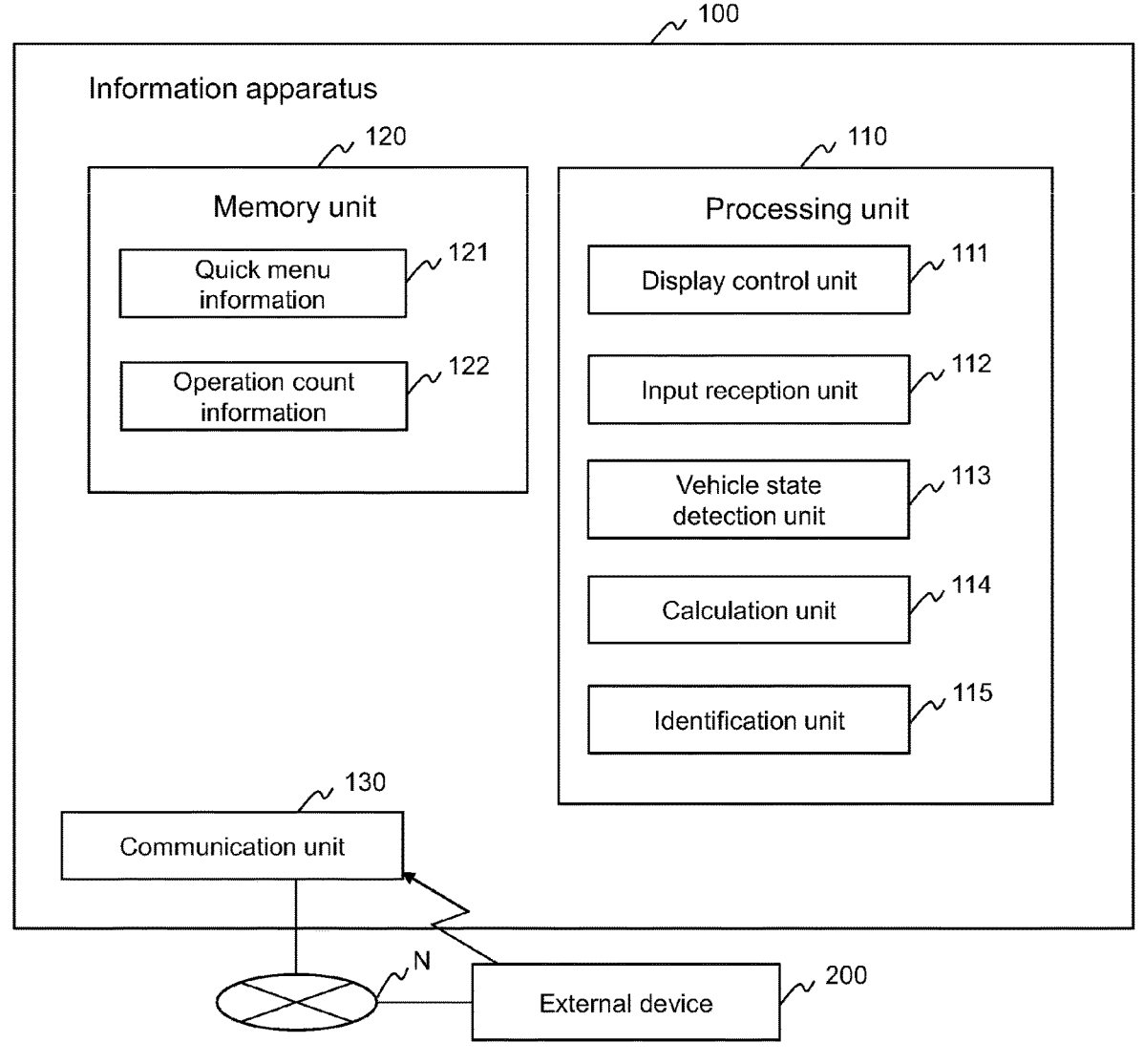
FIG. 1 is a diagram depicting an example of a schematic configuration of an information apparatus.

FIG. 1 is a diagram depicting an example of a schematic configuration of an information apparatus 100 in the present embodiment. An information apparatus 100 is, for example, an in-vehicle infotainment device equipped with a navigation function such as display of map information, route guidance, and the like, a broadcast reception function, and an audio/visual function. Broadcast reception functions include AM radio broadcasts, FM radio broadcasts, and terrestrial digital TV broadcasts, and other reception functions. Furthermore, audio/visual functions include, for example, a USB audio function that plays back information (for example, video/audio information) recorded on a USB (Universal Serial Bus) and a function that plays back information recorded on a DVD (Digital Versatile Disc).

Note that such information apparatus 100 is not limited to an in-vehicle infotainment device. For example, the information apparatus 100 may be a smartphone or tablet terminal with application software installed to achieve navigation, broadcast reception, and audio/visual functions.

The information apparatus 100 in the present embodiment proposes to a user, functions that are used more frequently than a prescribed count or more, depending on a vehicle state (driving state), which indicates whether or not the vehicle is in motion, and a screen mode set with respect to displaying on a display. By making such proposals, the information apparatus 100 further improves the operability and convenience of various functions.

To execute the processing above, the information apparatus 100 has a processing unit 110, a memory unit 120, and a communication unit 130.

The processing unit 110 is a functional unit for performing various processes executed by the information apparatus 100. Specifically, the processing unit 110 has a display control unit 111, an input reception unit 112, a vehicle state detection unit 113, a calculation unit 114, and an identification unit 115.

The display control unit 111 is a functional unit for performing control related to displaying on a display serving as a display device of the information apparatus 100. Specifically, the display control unit 111 generates and displays screen information related to a function of an operation target selected by the user (for example, navigation function, broadcast reception function, audio/visual function, and various other functions) on the display.

More specifically, the display control unit 111 sets a screen mode according to a function selected by the user as an operation target, and displays various information on the display according to the screen mode. For example, the display control unit 111 sets a navigation screen mode when the user selects the navigation function as the operation target. The display control unit 111 displays basic information (for example, map information) and an operation item for receiving instructions to execute detailed functions included in the navigation function (for example, map display, route search, route guidance, search without expressways, gas station search, and the like) according to the set screen mode. An operation item is information displayed on the display for the user to select. Upon detecting selection of an operation item, the information apparatus 100 executes processing related to a detailed function corresponding to the operation item.

For example, the display control unit 111 sets the radio screen mode when the user selects a broadcast reception function (for example, FM radio broadcast reception function) as the operation target. The display control unit 111 displays, in accordance with the set screen mode: basic information (for example, frequency of a set radio station); and an operation item for receiving instructions to execute detailed functions included in the broadcast reception function (for example, station selection, EQ (equalizer) setting, vehicle speed-linked VOL (volume) setting, road traffic information reception, and the like).

The display control unit 111 displays a quick menu button at a prescribed position among the screen information displayed on the display for receiving an instruction from the user to call up the quick menu.

Figure 2:
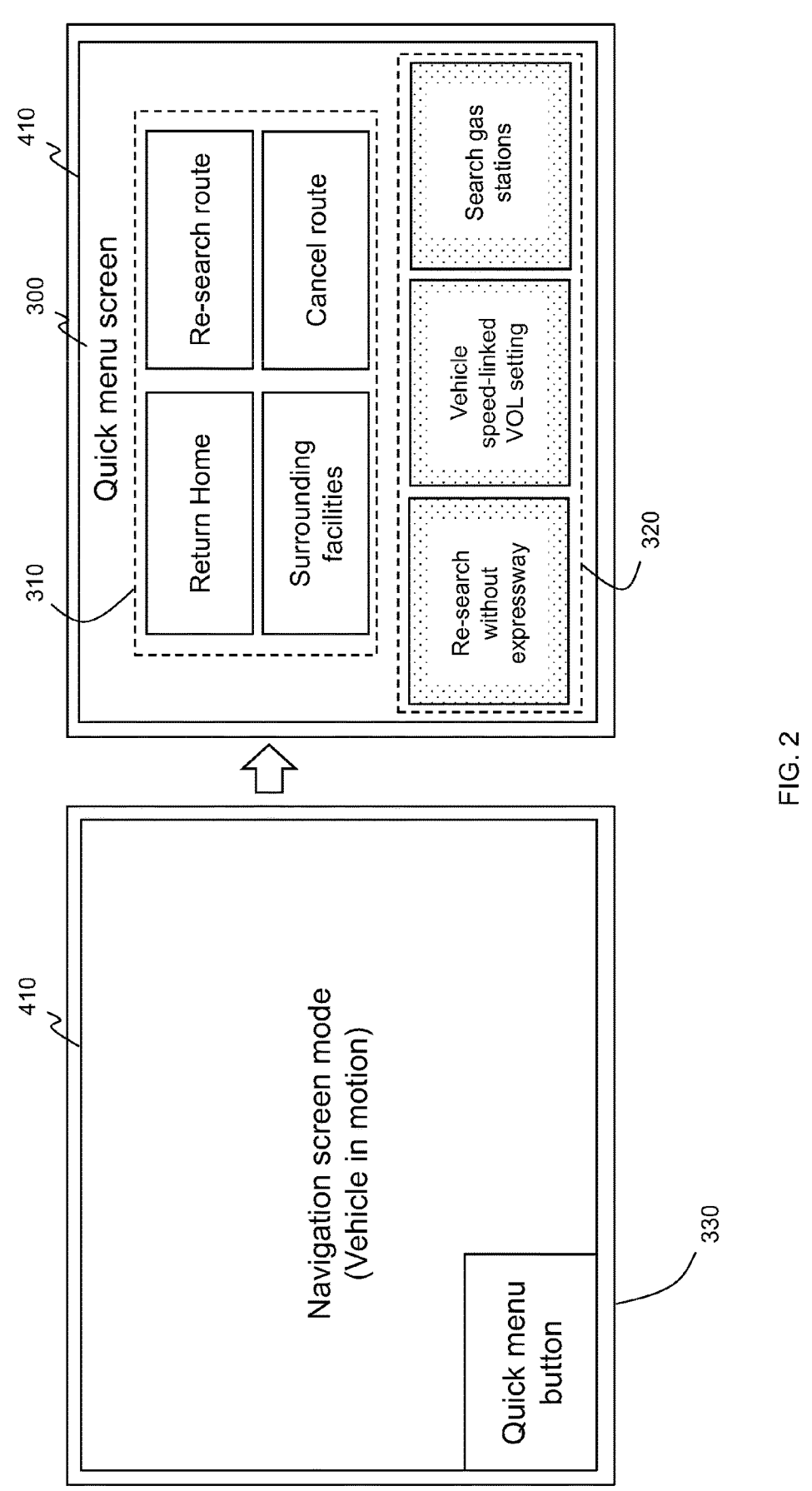
FIG. 2 is a diagram for describing an example of a quick menu screen.

FIG. 2 is a diagram for describing an example of a quick menu screen 300. The quick menu screen 300 is a screen that aggregates and displays the operation items of the detailed functions that the user has pre-registered and the detailed functions that are proposed to the user. By using the quick menu screen 300, the user can easily display the operation items corresponding to the registered desired functions on a display 410.

In the example depicted in the drawing, a quick menu button 330 is displayed in a lower left part of the display 410. When the user selects the quick menu button 330, the display control unit 111 generates screen information for the quick menu screen 300 and displays the information on the display 410. Note that display position, size, and shape of the quick menu button 330 are not limited to the example depicted in the drawing, and may be set as appropriate.

As depicted in the drawing, the quick menu screen 300 has a fixed display region 310 and a variable display region 320. In the fixed display region 310, a system default and operation item of a detailed function that has been pre-registered by the user are displayed so as to be selectable by the user. In the variable display region 320, an operation item of a detailed function identified by an operation item proposal processing described later are displayed so as to be selectable by the user.

The display control unit 111 uses quick menu information 121 stored in a memory unit 120 to identify an operation item to be displayed in the fixed display region 310. The quick menu information 121 contains an operation item of a detailed function that the user has pre-registered.

The display control unit 111 displays in the variable display region 320 an operation item of a detailed function that is identified by the identification unit 115 in the operation item proposal processing and for which the operation count exceeds a prescribed number (for example, 10 operations). Specifically, the display control unit 111 displays an operation item in the variable display region 320 that has a higher number of operations (for example, three) among the operation items of detailed functions for which operation count exceeds a prescribed number. The operation item displayed in the variable display region 320 is identified by the identification unit 115 as an operation item that does not overlap with the operation item displayed in the fixed display region 310.

The input reception unit 112 is a functional unit for receiving information input from the user via an input device. Specifically, the input reception unit 112 receives, via the input device, selection instructions from the user for the various functions displayed on the display 410 and for the operation items of the detailed functions included in the selected functions. An input device installed in the information apparatus 100 includes, for example, a touch panel on the display 410 of the information apparatus 100, a hard switch, a microphone for receiving a speech input instruction, and a controller disposed in a center console of a vehicle.

The vehicle state detection unit 113 is a functional unit for detecting a vehicle state related to the running of a vehicle equipped with the information apparatus 100. Specifically, the vehicle state detection unit 113 detects the vehicle state (whether the vehicle is in motion or stopped) based on changes in position information obtained from a GPS (Global Positioning System) information receiver installed in the information apparatus 100 and information output from an acceleration sensor. When the information apparatus 100 is in-vehicle equipment, the vehicle state detection unit 113 may detect the vehicle state using information output from a vehicle speed sensor installed in the vehicle, for example.

The vehicle state detection unit 113 may acquire information output from a control ECU (Electronic Control Unit) that outputs vehicle speed information via a CAN (Controller Area Network) and detect the vehicle state based on the information.

The calculation unit 114 is a functional unit for calculating the operation count of the function selected by the user. Specifically, by performing the operation count calculation processing, the calculation unit 114 records the operation count of a detailed function selected by the user in the operation count information 122 in association with the vehicle state and the type of screen mode that was set when the detailed function was selected.

The identification unit 115 is a functional unit for identifying an operation item of a detailed function whose operation count exceeds a prescribed number (for example, 10 operations). Specifically, the identification unit 115 performs the operation item proposal processing using the operation count information 122 in the memory unit 120, and from among the operation items, identifies operation items for which a prescribed operation count or more have been recorded with associated conditions that match the vehicle state and screen mode set at the time the processing is executed.

Next, the memory unit 120 will be described. The memory unit 120 is a functional unit for storing various types of information used in processing performed by the information apparatus 100. Specifically, the memory unit 120 stores the quick menu information 121 and operation count information 122.

The quick menu information 121 has various information related to the display contents on the quick menu screen 300. Specifically, the quick menu information 121 contains, for example, an operation item of a detailed function registered by the user and displayed in the fixed display region 310 of the quick menu screen. In addition, the quick menu information 121 has registered therein, information defining a display format, such as an upper limit number of operation items displayed in the fixed display region 310 and the variable display region 320, display position, and the like.

FIG. 3 is a diagram depicting an example of the operation count information 122. FIG. 3 depicts one example as of Sep. 24, 2022. The operation count information 122 is information in which the operation count of a detailed function of the user is recorded. This operation count information 122 includes a plurality (for example, four periods) of tables 122-1 to 122-4 created for each prescribed unit period (for example, one week). Specifically, in the operation count information 122, the screen mode and vehicle state (in motion or stopped) that was set when a certain operation item was selected, and the number of times the corresponding operation item was selected (the number of times the detailed function corresponding to the operation item was used) are associated and stored on a weekly basis. When performing the operation item proposal processing, the identification unit 115 uses the total operation count in the same target operation item registered in each table 122-1 to 122-4 of the operation count information 122.

For example, the example of the operation count information 122 depicted in FIG. 3 depicts that a detailed function of "Return Home" was used 10 times in week 38 of 2022 (September 19 to September 25) when the radio screen mode was set and the vehicle was in motion. In addition, the example of the operation count information 122 depicted in FIG. 3 depicts that a detailed function of "Search For Gas Stations" was used 8 times in week 38 of 2022 when the navigation screen mode was set and the vehicle was stopped.

Note that the total operation count, the total number of operations while the vehicle is in motion, and the total operation count while the vehicle is stopped are also stored in the operation count information 122 for each operation item. In addition, each of the tables 122-1 to 122-4 of the operation count information 122 is sequentially deleted after a prescribed storage period (for example, four weeks). FIG. 3 depicts a state on September 24, for example. Therefore, tables prior to week 34 of 2022 in which four weeks have elapsed since created are deleted. Through such processing, the operation count information 122 always maintains operation information during the most recent weeks. On the other hand, old weekly operation information that has passed the prescribed period is deleted from the operation count information 122, and thus is no longer reflected in the operation item proposal processing. Deletion of a table for which a prescribed period of time has elapsed is carried out by a prescribed functional unit not depicted in the drawings. The unit period and storage period in the aforementioned table are examples and may be set as appropriate.

The communication unit 130 is a functional unit for performing information communication with an external device 200. Specifically, the communication unit 130 receives radio and terrestrial digital TV broadcasts from, for example, radio station and TV station broadcasting apparatuses. The communication unit 130 obtains road traffic information and the like from the external device 200 (for example, information distribution device) via a prescribed network N, such as the Internet, LAN (Local Area Network), or the like, for example.

The above is a description of an example of a functional configuration of the information apparatus 100.

Figure 4:
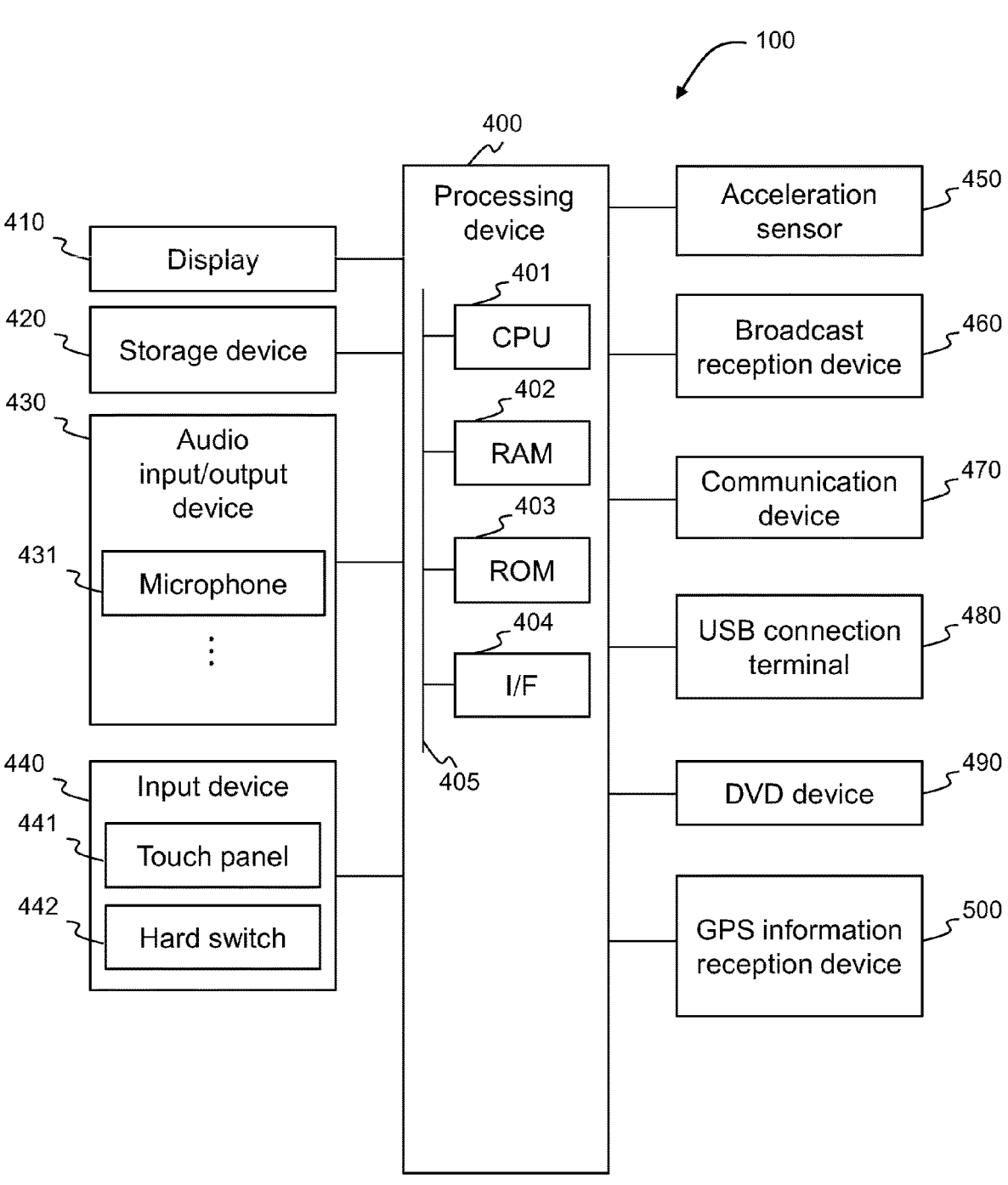
FIG. 4 is a diagram depicting an example of a hardware configuration of the information apparatus.

FIG. 4 is a diagram depicting an example of a hardware configuration of the information apparatus 100. As depicted in the drawing, the information apparatus 100 has a processing device 400, a display 410, a storage device 420, an audio input/output device 430, an input device 440, an acceleration sensor 450, a broadcast receiver 460, a communication device 470, a USB connection terminal 480, a DVD device 490, and a GPS information receiver 500.

The processing device 400 is a unit for controlling each part of the information apparatus 100. Specifically, the processing unit 400 includes: a CPU (Central Processing Unit) 401 that executes arithmetic processing; a RAM (Random Access Memory) 402 that temporarily stores various types of information read from the storage device 420; a ROM (Read Only Memory) 403 that stores a program and the like executed by the CPU 401; an I/F (interface) 404 that connects various hardware to the processing device 400; and a bus 405 that interconnects these devices.

The display 410 is a unit for displaying graphics information, such as a liquid crystal or organic EL display. The storage device 420 is at least a readable/writeable storage medium, such as an SSD (solid state drive), an HDD (hard disk drive), or a non-volatile memory card.

The audio input/output device 430 is, for example, a microphone 431 for collecting audio emitted by a driver and occupants. The input device 440 is a device for receiving a user instruction input, such as a touch panel 441 or a hard switch 442 (for example, a dial switch or the like).

The acceleration sensor 450 is a device for measuring the acceleration (change in speed per unit time) of an object. The GPS information receiver 500 is a device for receiving electromagnetic waves from an artificial satellite (GPS satellite). The processing device 400 calculates the vehicle speed based on the change in position information per time obtained from the GPS information receiver 500 or the integral value of acceleration obtained by the acceleration sensor 450.

The broadcast receiver 460 is hardware for receiving an FM broadcast, AM broadcast, terrestrial digital TV broadcast, and the like. The communication device 470 is a communication unit for performing wireless and wired communications with the external device 200.

The USB connection terminal 480 is a connection terminal for connecting an external USB device (for example, USB audio, smartphone, and the like). The DVD device 490 is, for example, a DVD drive for playing back information stored on a storage medium such as DVD-ROM or the like.

The processing unit 110 of the information apparatus 100 is implemented by means of a program that causes the CPU 401 of the processing device 400 to perform processing. These programs are stored in the storage device 420 and ROM 403, for example, and are loaded onto the RAM 402 for execution and executed by the CPU 401. The memory unit 120 may be implemented by the RAM 402, ROM 403 or storage device 420, or a combination thereof. In addition, the communication unit 130 may be realized by the broadcast receiver 460 or communication device 470, or may be realized by a combination thereof.

Note that each functional block of the information apparatus 100 was classified according to main processing contents to facilitate understanding of each function realized in the present embodiment. Therefore, the present invention is not limited by the manner each function is classified or by the name thereof. The configurations of the information apparatus 100 may be further classified into many structural elements, depending on the processing content. The configurations of the information apparatus 100 can also be classified such that one structural element executes more processing, depending on the processing content.

All or part of each functional unit may be constructed by hardware (for example, integrated circuits such as ASICs and the like) implemented in a computer. In addition, processing of each functional unit may be executed by a single hardware or by hardware.

The following description relates to specific processing content performed by the information apparatus 100.

Figure 5:
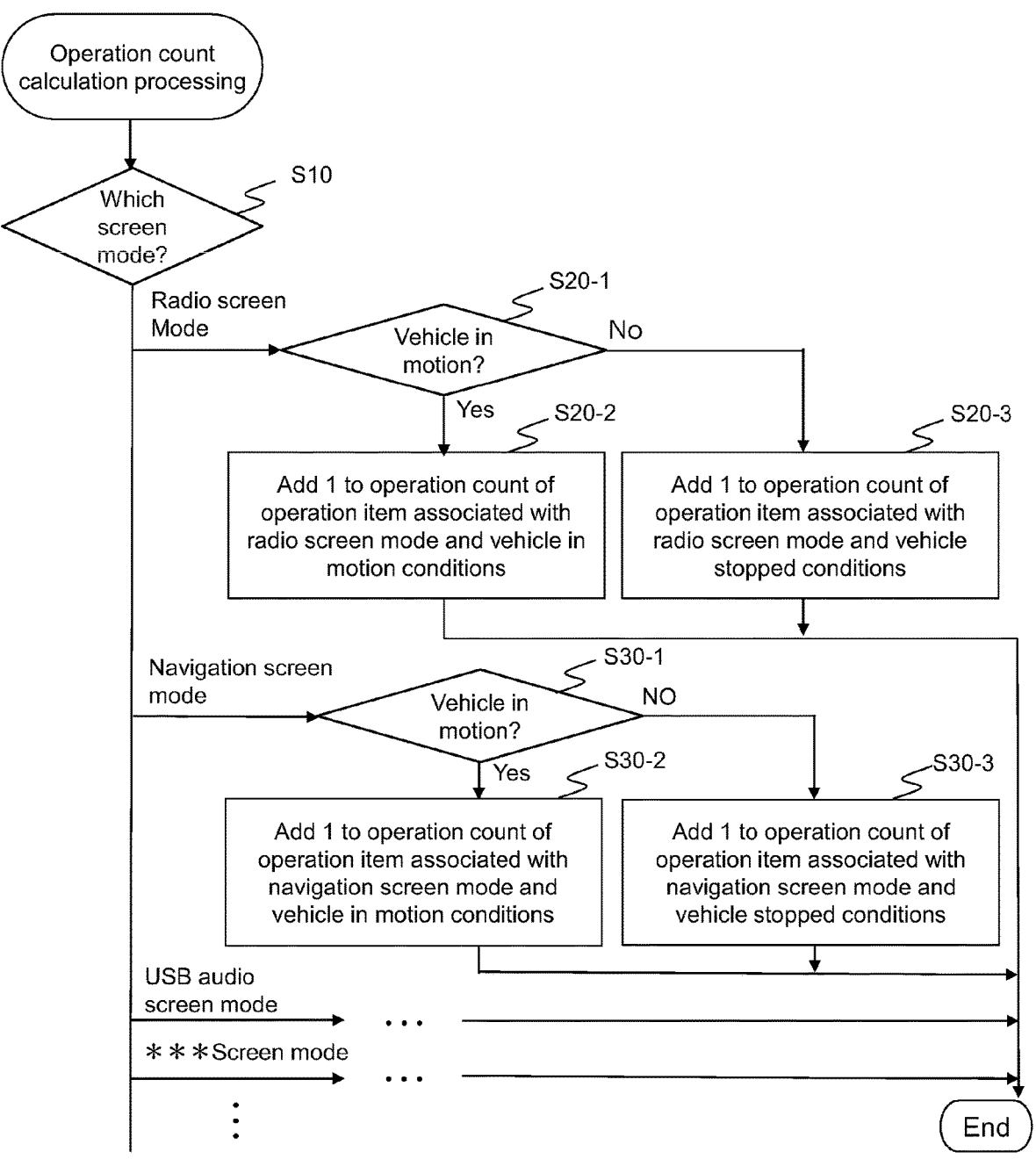
FIG. 5 is a diagram depicting an example of operation count calculation processing.

FIG. 5 is a diagram depicting an example of operation count calculation processing. This processing is initiated, for example, when the user selects one of the operation items of the detailed functions depicted on the display 410. Note that the calculation unit 114 identifies the operation items selected by the user via the input reception unit 112.

When the processing is initiated, the display control unit 111 determines which screen mode is set (step S10). Specifically, the display control unit 111 identifies the type of screen mode that is set when the user selects an operation item of a detailed function.

The display control unit 111 determines the next transition step according to the type of screen mode identified. For example, if the screen mode identified is a radio screen mode, the display control unit 111 transitions the processing to step S20-1. For example, if the screen mode identified is a navigation screen mode, the display control unit 111 transitions the processing to step S30-1. For example, if the screen mode identified is a USB audio screen mode, or if the screen mode corresponds to another function, the display control unit 111 transitions the processing to a step corresponding to the respective screen mode.

In the description using FIG. 5, specific processing in the radio and navigation screen modes are described as examples.

If the set screen mode is the radio screen mode, the vehicle state detection unit 113 determines whether the vehicle is in motion or not (step S20-1). Furthermore, if the vehicle state detection unit 113 determines that the vehicle is in motion (Yes in step S20-1), the processing transitions to step S20-2. On the other hand, if the vehicle state detection unit 113 determines that the vehicle is not in motion (No in step S20-1), the processing transitions to step S20-3.

In the processing of step S20-2, the calculation unit 114 adds 1 to the operation count for the operation item of the latest operation count information 122-1 associated with the radio screen mode and the condition of the vehicle being in motion. In addition, upon updating the operation count, the calculation unit 114 terminates the processing in the flow.

In the processing of step S20-3, the calculation unit 114 adds 1 to the operation count for the operation item of the latest operation count information 122-1 associated with the radio screen mode and the condition of the vehicle being stopped. Upon updating the operation count, the calculation unit 114 terminates the processing in the flow.

If the set screen mode is the navigation screen mode, the vehicle state detection unit 113 determines whether the vehicle is in motion or not (step S30-1). Furthermore, if the vehicle state detection unit 113 determines that the vehicle is in motion (Yes in step S30-1), the processing transitions to step S30-2. On the other hand, if the vehicle state detection unit 113 determines that the vehicle is not in motion (No in step S30-1), the processing transitions to step S30-3.

In the processing of step S30-2, the calculation unit 114 adds 1 to the operation count for the operation item of the latest operation count information 122-1 associated with the navigation screen mode and the condition of the vehicle being in motion. Upon updating the operation count, the calculation unit 114 terminates the processing in the flow.

In the processing of step S30-3, the calculation unit 114 adds 1 to the operation count for the operation item of the latest operation count information 122-1 associated with the navigation screen mode and the condition of the vehicle being stopped. Upon updating the operation count, the calculation unit 114 terminates the processing in the flow.

In this manner, the calculation unit 114 calculates the operation count of the detailed function operated by the user and updates the operation count information 122 associated with the corresponding condition.

The vehicle state detection unit 113 and the calculation unit 114 perform the same processing in screen modes other than the radio screen mode and navigation screen mode. For example, if the screen mode is in a USB audio screen mode, the vehicle state detection unit 113 determines whether the vehicle is in motion or not. Upon determining that the vehicle is in motion, the calculation unit 114 adds 1 to the operation count of the operation item for the latest operation count information 122-1 associated with the USB audio screen mode and the condition of the vehicle being in motion. Upon determining that the vehicle is stopped, the calculation unit 114 also adds 1 to the operation count of the operation item for the latest operation count information 122-1 associated with the USB audio screen mode and the condition of the vehicle being stopped.

The vehicle state detection unit 113 and the calculation unit 114 perform the same processing as above even if the screen mode identified in step S10 is a screen mode corresponding to another function. In the processing of steps S20-2, S20-3, S30-2 and S30-3, the vehicle state detection unit 113 and the calculation unit 114 perform addition processing of the operation count with respect to table 122-1 of the latest unit period including the processing date. In the processing of steps S20-2, S20-3, S30-2 and S30-3, if there is no unit period table that includes the processing date in the operation count information 122, the calculation unit 114 creates a new unit period table.

The above is a description of an example of the operation count calculation processing.

The following is a description of an example of the operation item proposal processing.

Figure 6:
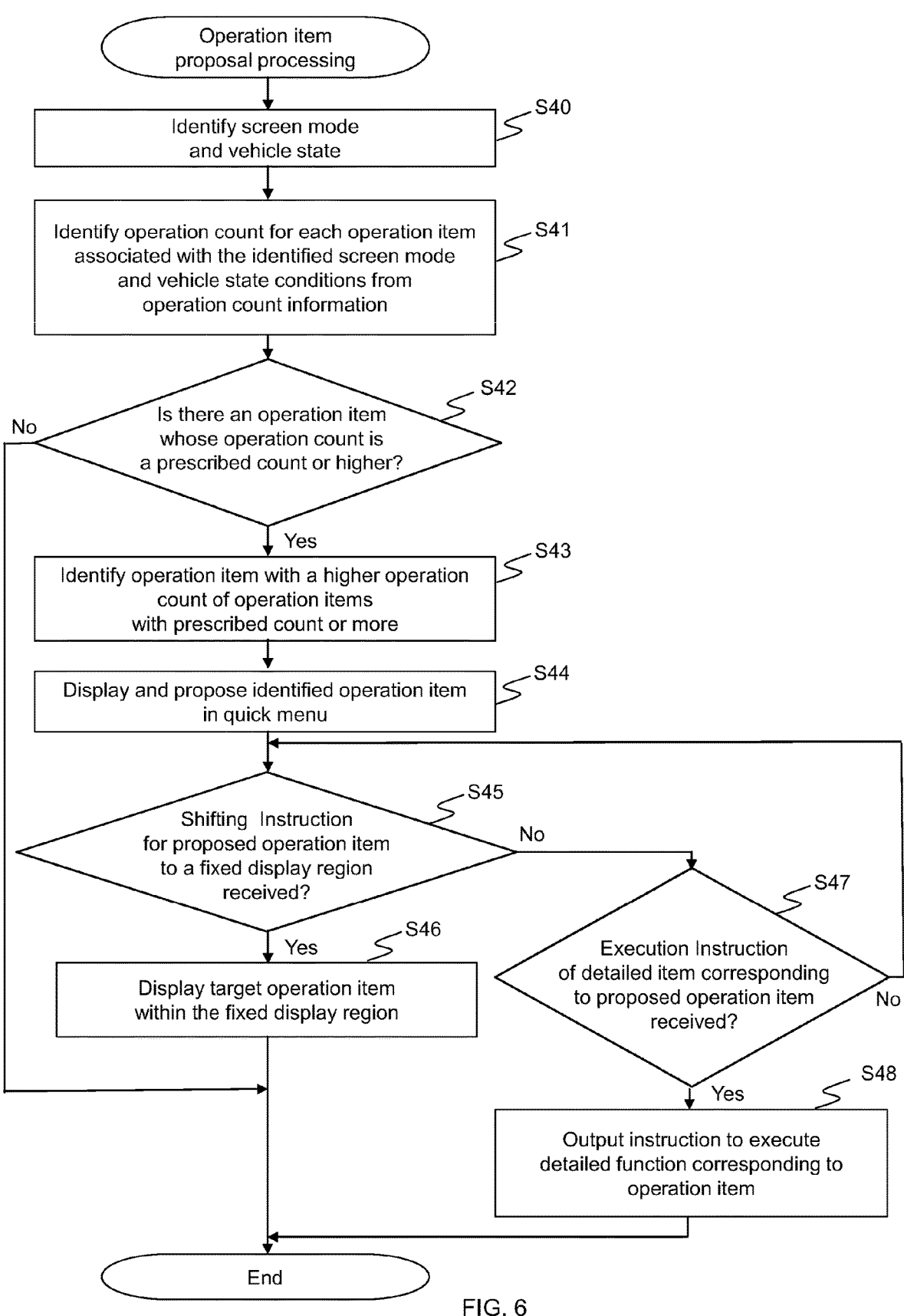
FIG. 6 is a diagram depicting an example of operation item proposal processing.

FIG. 6 is a diagram depicting an example of operation item proposal processing. The operation item proposal processing is initiated, for example, when the quick menu button 330 on the display 410 is selected.

Once the processing is initiated, the identification unit 115 identifies the screen mode and vehicle state (step S40). Specifically, the identification unit 115 identifies, via the display control unit 111, the screen mode that is set at the time the processing is executed. The identification unit 115 identifies, via the vehicle state detection unit 113, the vehicle state indicating whether or not the vehicle is in motion at the time the processing is executed.

Next, the identification unit 115 identifies the operation count for each operation item associated with the identified screen mode and vehicle state conditions from the total value of each table 122-1 to 122-4 existing in the operation count information 122 (step S41). Specifically, the identification unit 115 identifies for each table 122-1 to 122-4 the operation count of an operation item associated with the same conditions as the identified screen mode and vehicle state conditions, which are then added together. More specifically, upon identifying, for example, that the screen mode and the vehicle state are navigation screen mode and in motion, respectively, the identification unit 115 identifies the operation count registered in the operation items of each table 122-1 to 122-4 with which the condition is associated. If the operation items (for example, gas station search) in each of the tables 122-1 to 122-4 associated with the identified condition have operation counts of 2, 3, 3, and 5 times, respectively, the identification unit 115 identifies the sum of these values (13 times).

Next, the identification unit 115 determines whether among the identified operation items, there is an operation item for which the operation count is a prescribed count (for example, 10 or more times or the like) or more (step S42).

Furthermore, if the identification unit 115 determines that there are no operation items of a prescribed count or more (No in step S42), the processing in the present flow is terminated. On the other hand, if the identification unit 115 determines that there are a prescribed count or more of operation items (Yes in step S42), the processing transitions to step S43.

Next, the identification unit 115 identifies, in the processing of step S43, the operation item with a larger operation count among the operation items of a prescribed count or more. Specifically, the identification unit 115 identifies, using the quick menu information 121, an operation item that does not overlap with an operation item of a detailed function pre-registered by the user from among the operation items of a prescribed count or more.

The identification unit 115 identifies from the operation count information 122 the number of operation items of a prescribed count or more, which do not overlap with operation items pre-registered by the user. The identification unit 115 uses the quick menu information 121 to identify the upper limit number of the variable display region to be displayed, and identifies the operation items with a higher operation count within a range not exceeding the upper limit.

Next, the display control unit 111 displays the identified operation items on the quick menu screen 300 and proposes detailed functions corresponding to the operation items to the user (step S44). Specifically, the display control unit 111 displays the operation items identified by the identification unit 115 in the variable display region 320 of the quick menu screen 300, thereby proposing to the user detailed functions of operation items with high frequency of use under the same conditions as the screen mode and vehicle state set at the time the processing is executed.

Figure 7:
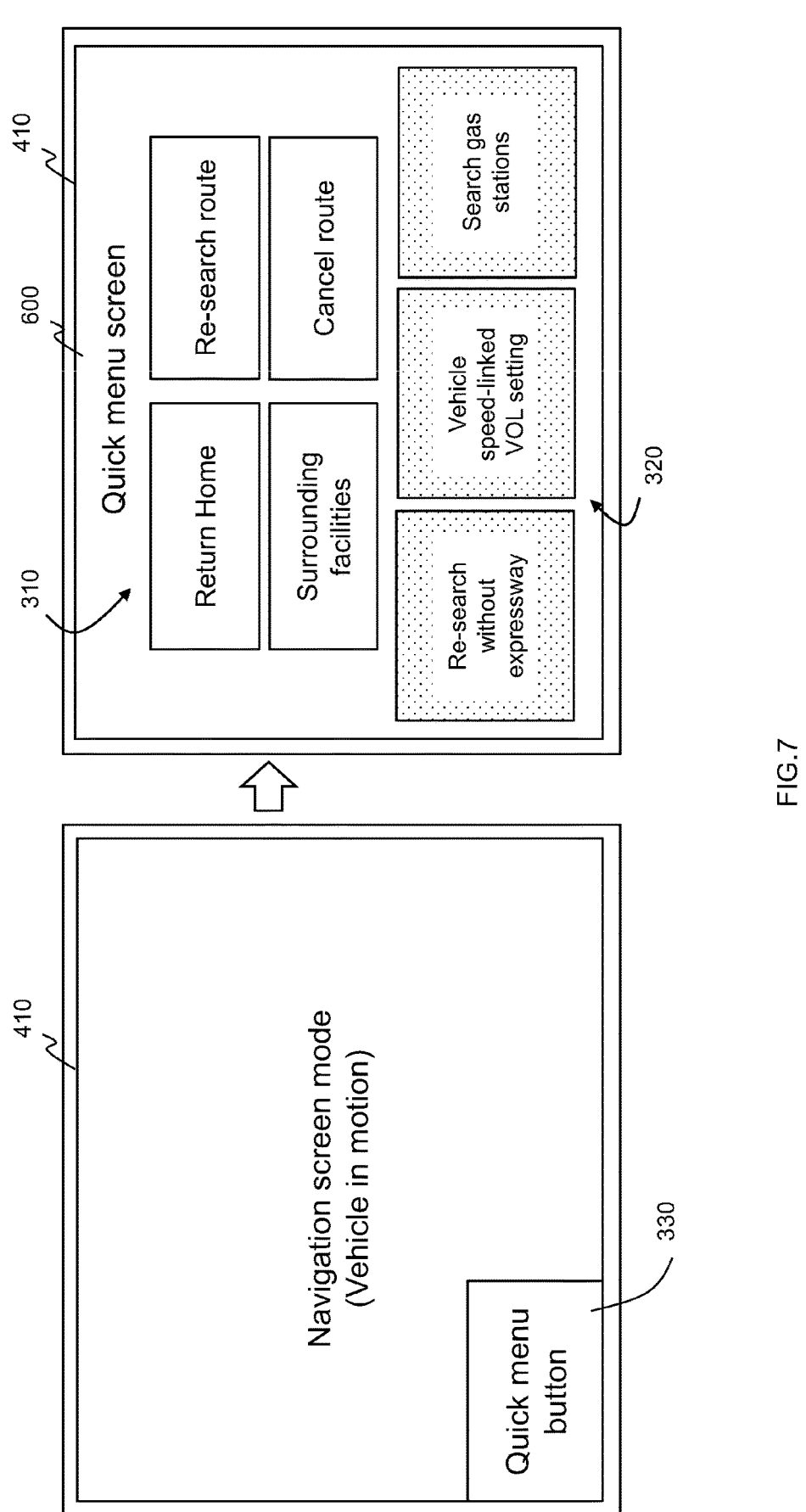
FIG. 7 is a diagram depicting an example of a quick menu screen when a navigation screen mode (vehicle is in motion) is set.
Figure 8:
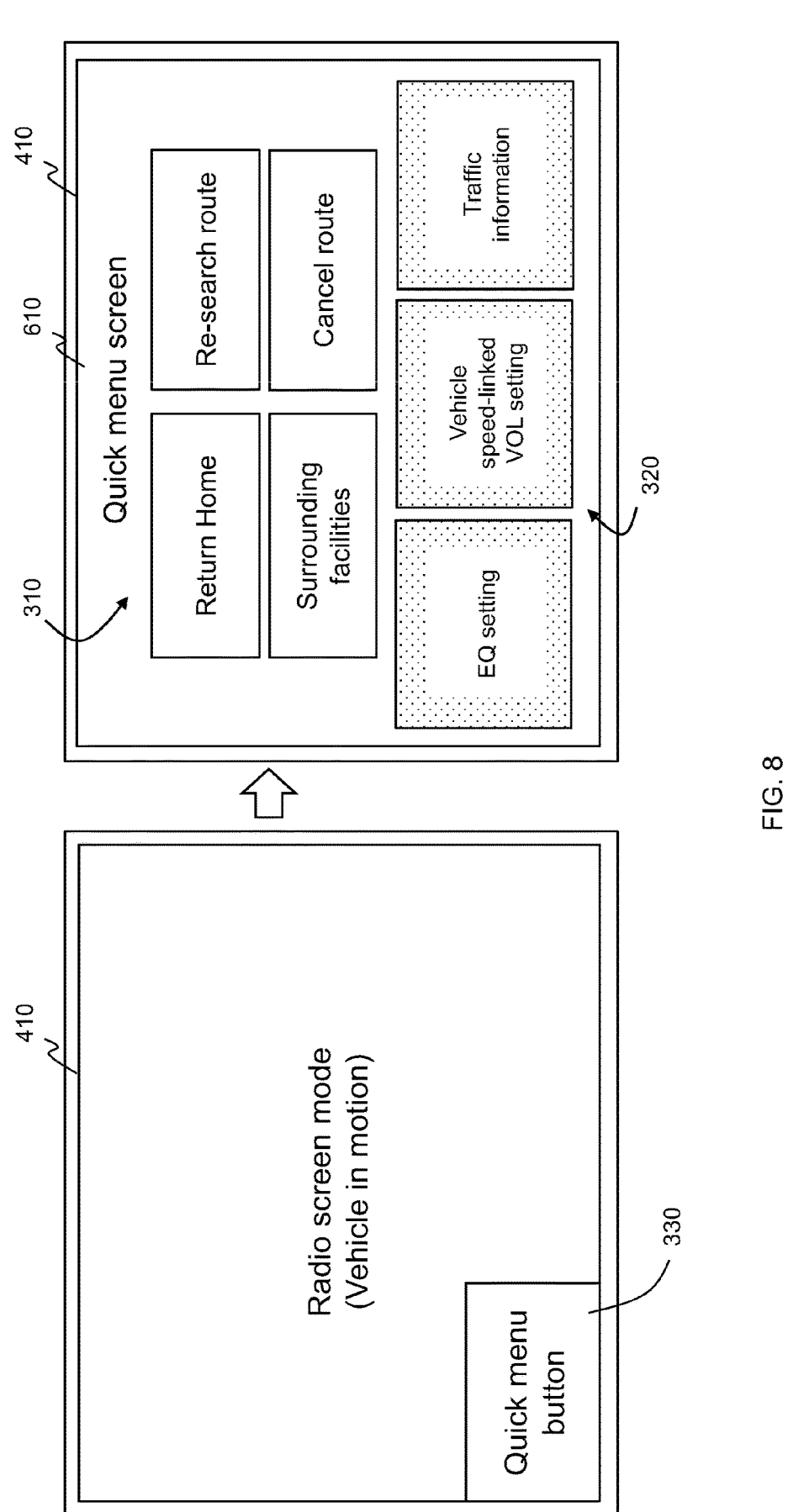
FIG. 8 is a diagram depicting an example of a quick menu screen displayed when a radio screen mode is set and the vehicle is in motion.
Figure 9:
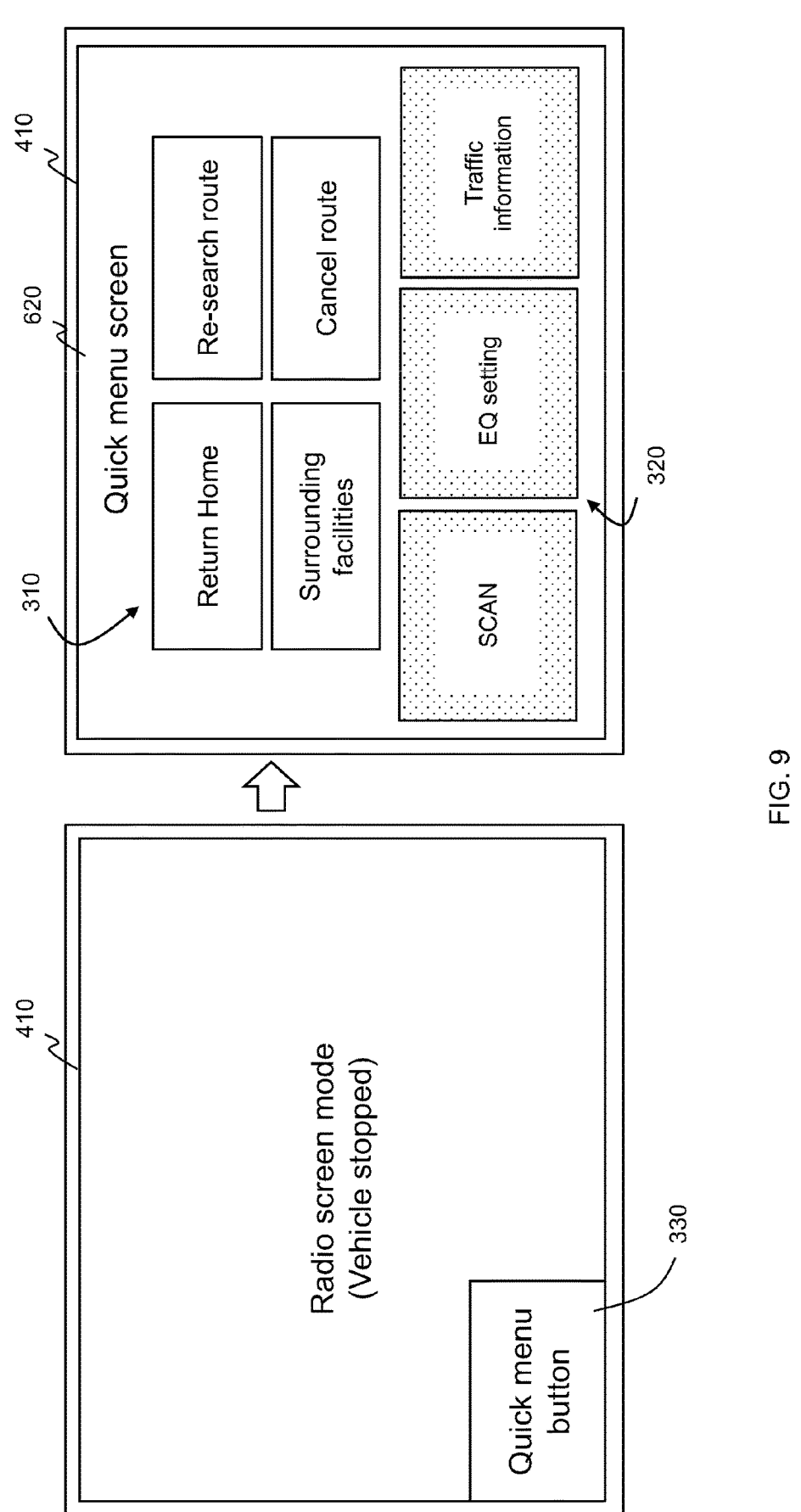
FIG. 9 is a diagram depicting an example of a quick menu screen displayed when a radio screen mode is set and the vehicle is stopped.

FIGS. 7 to 9 each depict an example of a quick menu screen displayed in different screen modes or vehicle states. FIG. 7 is a diagram depicting an example of a quick menu screen 600 when a navigation screen mode (vehicle is in motion) is set. FIG. 8 is a diagram depicting an example of a quick menu screen 610 displayed when a radio screen mode is set and the vehicle is in motion. FIG. 9 is a diagram depicting an example of a quick menu screen 620 displayed when a radio screen mode is set and the vehicle is stopped.

As depicted in the drawings, the operation items of the detailed functions displayed in the variable display region 320 of quick menu screens 600 to 620 differ according to the screen mode set and the vehicle state. This is because the operation items displayed in the variable display region 320 are those with high frequency of use under the same conditions as the screen mode and vehicle state set when the quick menu button 330 is selected (at the time the operation item proposal processing is executed).

In other words, the information apparatus 100 can propose to the user operation items of detailed functions with high frequency of use in the past under the same conditions as the screen mode and vehicle state set at a timing when a quick menu screen display instruction is received. In other words, the information apparatus 100 displays on the quick menu screen the operation items of the functions that the user is most likely to desire to use at a timing when the user provides instruction to display the quick menu screen. Therefore, the information apparatus 100 can improve not only user operability but also convenience.

Next is a description of step S45 in FIG. 6. In step S45, the identification unit 115 determines whether or not a shifting instruction to the fixed display region 310 is received via the input reception unit 112 for an operation item proposed to the user. For example, when a long-press operation is performed on an operation item displayed in the variable display region 320, the identification unit 115 determines that an instruction to shift the operation item to the fixed display region 310 has been received.

User instructions for shifting are not limited to a long-press operation for an operation item. For example, the identification unit 115 may determine that a shifting instruction has been received when a drag-and-drop operation is received for an operation item in the variable display region 320 to the fixed display region 310. Alternatively, the identification unit 115 may determine that a shifting instruction has been received, for example, when a prescribed speech instruction is received via the microphone 431 to shift the operation item into the fixed display region 310.

Furthermore, if the identification unit 115 determines that the shifting instruction has been received (Yes in step S45), the target operation item is displayed in the fixed display region 310 via the display control unit 111 (step S46). The identification unit 115 registers the shifting operation items in the quick menu information 121 as operation items to be displayed in the fixed display region 310.

The identification unit 115 checks the display upper limit number of the fixed display region 320 registered in the quick menu information 121. Furthermore, if the display upper limit number is exceeded by shifting (adding) the operation item in the variable display region 320 to the fixed display region 310, the identification unit 115 receives a user instruction for the operation item to be deleted from the fixed display region 310. The identification unit 115 deletes the operation item from the quick menu information 121 for which the deletion instruction is received.

In addition, if the identification unit 115 determines in the processing of step S45 that the shifting instruction has not been received (No in step S45), processing transitions to step S47.

In step S47, the identification unit 115 determines whether or not an instruction to execute a detailed function corresponding to the proposed operation item has been received. For example, when a short-press operation is performed on an operation item displayed in the variable display region 320, the identification unit 115 determines that an instruction to execute the detailed function corresponding to the operation item has been received.

Furthermore, if the identification unit 115 determines that the instruction is not received (No in step S47), the processing returns to step S45. On the other hand, if it is determined that the instruction is received (Yes in step S47), the identification unit 115 outputs an instruction to execute the detailed function corresponding to the target operation item to the prescribed functional unit (not depicted) that executes the detailed function (step S48), and the processing in this flow is terminated.

The above is a description of an example of the operation item proposal processing.

The information apparatus according to such an embodiment can propose a function with a high frequency of use to a user according to the appropriate situation and improve the operability and convenience of various functions. In particular, the information apparatus proposes to the user a function corresponding to an operation item with high frequency of use under the same conditions as the screen mode and vehicle state set at the time the quick menu screen display instruction is received. This enables the information apparatus to display on the quick menu screen the operation items for functions that the user is most likely to desire to use at any given time. In other words, the information apparatus can display on the quick menu screen the operation items of the functions that the user is most likely to desire to use at a timing when the user provides instruction to display the quick menu screen, to provide a proposal to the user. Therefore, the information apparatus can improve not only operability but also convenience.

Note that the information apparatus 100 in the present embodiment is not limited to the embodiment above, and various modifications are possible within the scope of the same inventive concept. In the embodiment described above, an example was described in which a long-press operation or the like of the operation item is received when shifting an operation item of a detailed function displayed in the variable display region 320 of the quick menu screen to the fixed display region 310. On the other hand, the information apparatus 100 according to a modified example displays a pop-up screen to confirm to the user the shift to the fixed display region 310, and performs the shift of the operation item when the user's instruction is received.

The identification unit 115 of the information apparatus 100 in the modified example always refers to the operation count information 122 to ascertain the operation count of operation items that match the screen mode and vehicle state conditions set at that point in time. Furthermore, if there are operation items with an operation count of a prescribed number or more, the operation items with higher operation counts are identified.

The identification unit 115 detects that the vehicle has stopped via the vehicle state detection unit 113. Furthermore, when the vehicle is stopped, the identification unit 115 displays the quick menu button 330 with a blinking light via the display control unit 111 to notify the user that there is a proposal related to the quick menu.

Upon detecting that the quick menu button 330 is selected via the input reception unit 112, the identification unit 115 generates, via the display control unit 111, a pop-up screen that confirms to the user whether to add the operation item of the detailed function with a higher operation count to the fixed display region 310 of the quick menu screen, which is then displayed on the display 410.

Figure 10:
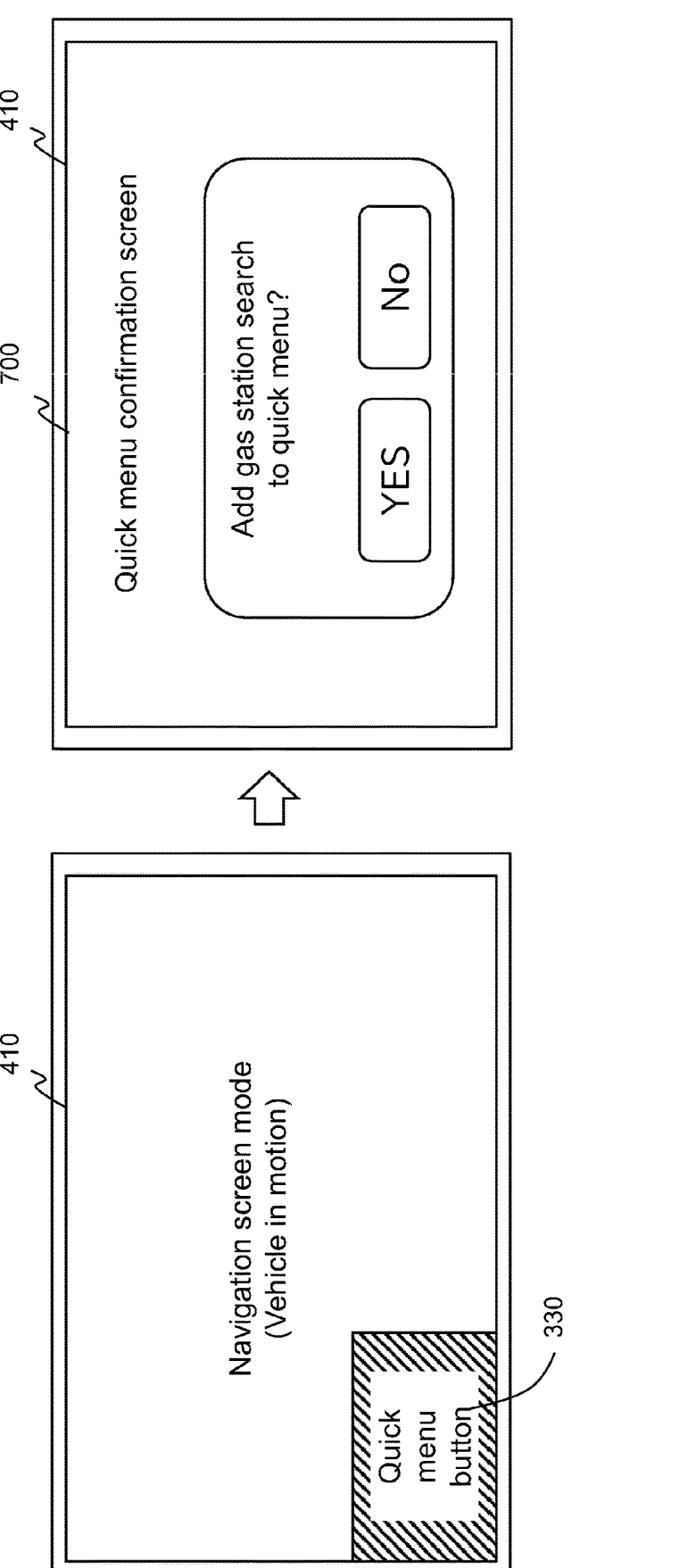
FIG. 10 is a diagram depicting an example of a pop-up screen according to a modified example.

FIG. 10 is a diagram depicting an example of a pop-up screen 700 according to a modified example. As depicted in the drawing, the identification unit 115, via the display control unit 111, displays the quick menu button 330 flashing when the vehicle comes to a stop. Upon detecting the selection of the quick menu button 330 via the input reception unit 112, the identification unit 115 displays a pop-up screen (the "Quick Menu Confirmation Screen" depicted in the drawing) on the display 410 to confirm with the user whether to add the operation item of the detailed function with a higher operation count to the fixed display region 310 of the quick menu screen. In the pop-up screen in FIG. 10, "Add to Quick Menu" means "Add to Fixed Display Region 310 in the Quick Menu Screen."

If the user's instruction is Yes, the identification unit 115 registers the proposed operation item of the detailed function in the quick menu information 121. Furthermore, the identification unit 115 displays the quick menu screen 600 depicted in FIG. 7, for example, on the display 410 via the display control unit 111.

Note that in the present modified example, the quick menu screen may be in a form that does not display the variable display region 320. This is because the identification unit 115 proposes to the user, via a pop-up screen, the operation items of detailed functions with a higher operation count. The present invention may be a combination of the embodiments and modified examples above.

The present invention is not limited to the embodiments and modified example above, but includes various other embodiments and modified examples. For example, while the aforementioned embodiments have been described in detail in order to describe the present invention in an easy-to-understand manner, the present invention is not necessarily limited to those with all the described configurations. The configuration of the embodiments can be partially shifted by a configuration of other embodiments or modified examples. The configuration of the embodiment can also be added to a configuration of other embodiments.

Furthermore, a part of the configuration of each embodiment can be added to, deleted from, or shifted with another configuration.

EXPLANATION OF REFERENCE SYMBOLS

100. Information apparatus,
110. Processing unit,
111. Display control unit,
112. Input reception unit,
113. Vehicle state detection unit,
114. Calculation unit,
115. Identification unit,
120. Storage unit,
121. Quick menu information,
122. Operation count information,
130. Communication unit,
200. External device,
N. Network

The invention claimed is:

1. An information apparatus placed in a vehicle, comprising:
   a vehicle state detection unit that detects whether the vehicle is in motion or stopped;
   a display control unit that controls a signal output to a display such that information containing operation items related to various functions provided by the information apparatus is displayed on the display;
   an input reception unit that receives an operation with respect to the operation items displayed on the display by a user;
   an execution unit that executes a command with respect to the operated operation item when the input reception unit receives the operation with respect to the operation item; and
   an identification unit that identifies a frequency of use of each of the operation items by classifying the operation items according to both a screen mode currently set for the display and whether the vehicle is in motion or stopped;
   wherein, the display control unit controls to display a prescribed menu on a screen including selected items from the operation items on the display;
   wherein, when the vehicle is in motion, the prescribed menu contains one or more operation items which are identified by the identification unit that their frequency of use during the vehicle is in motion is high;
   wherein, when the vehicle is stopped, the prescribed menu contains one or more operation items which is identified by the identification unit that their frequency of use during the vehicle is stopped is high; and
   wherein the identification unit periodically updates the frequency of use of each of the operation items information such that use instances of each operation item older than a predetermined time period are not included in the frequency of use.

2. The information apparatus according to claim 1,
   wherein, the prescribed menu is configured based on the function selected by the user, and said one or more operation items identified by the identification unit are limited to the operation items related to the selected function.

3. The information apparatus according to claim 1, wherein the prescribed menu screen contains a fixed display region and a variable display region, and the fixed display region contains a predetermined operation item or the operation item intentionally selected by the user, and the variable display region contains said one or more operation items with the high frequency of use on the variable display region.

4. The information apparatus according to claim 3, wherein at least one of the operation items in the fixed display region has been selected from the operation items in the variable display region by the user.

5. The information apparatus according to claim 1,
   wherein the display control unit displays screen information for confirming with the user whether or not to add the operation item with a high frequency of use to the prescribed menu screen, and if the user operates to instruct adding it to the prescribed menu screen, displays the operation item with a high frequency of use subject to the instruction on the prescribed menu screen.

6. The information apparatus according to claim 1, further comprising:
   a memory unit that stores operation count information in which the operation count of the operation item is accumulated in association with the vehicle state and a screen mode displayed on the display by the display control unit; and
   a calculation unit that updates the operation count information stored in the memory unit according to the vehicle state and the screen mode displayed when the operation item is operated,
   wherein the identification unit identifies the frequency of use of the operation item using the operation count information in the memory unit.

7. A menu display method in the information apparatus placed in a vehicle, comprising the steps of:
   detecting whether the vehicle is in motion or stopped;
   displaying information including a plurality of operation items related to various functions provided by the information apparatus on a display;
   receiving an operation with respect to the operation items displayed on the display;
   executing a command with respect to the operated operation item upon receiving the operation with respect to the operation item;
   identifying the frequency of use of each of the operation items by classifying the items according to both a screen mode set for the display and whether the vehicle is in motion or stopped; and
   displaying a prescribed menu screen including selected items from the operation items on the display;
   wherein, when the vehicle is in motion, the prescribed menu contains one or more operation items which is or are identified in that a frequency of use of the one or more operation items during the vehicle being in motion is high;
   wherein, when the vehicle is stopped, the prescribed menu contains one or more operation items which is identified that their frequency of use during the vehicle is stopped is high; and
   use during the vehicle is stopped is high; and
   wherein identifying the frequency of use further includes periodically updating the frequency of use of each of the operation items information such that use instances of each operation item older than a predetermined time period are not included in the frequency of use.

* * * * *